United States Patent [19]
Brackebusch et al.

[11] Patent Number: 6,004,607
[45] Date of Patent: Dec. 21, 1999

[54] CHILLING OF MEAT PRODUCTS

[75] Inventors: Scott A. Brackebusch, Marshall; Maurine A. MacBride, Oregon, both of Wis.

[73] Assignee: Krafts Foods, Inc., Northfield, Ill.

[21] Appl. No.: 09/096,237

[22] Filed: Jun. 11, 1998

[51] Int. Cl.$^6$ ....................................... A23B 4/00
[52] U.S. Cl. ................... 426/524; 62/64; 62/65; 426/327
[58] Field of Search ................... 426/524, 327; 62/64, 65

[56] References Cited

U.S. PATENT DOCUMENTS

| | | | |
|---|---|---|---|
| 1,947,506 | 2/1934 | Vogt | 426/524 |
| 1,979,124 | 10/1934 | Tival | 426/524 |
| 2,763,557 | 9/1956 | Helgerud | 426/327 |
| 4,309,449 | 1/1982 | O'Roark et al. | 426/524 |
| 4,343,821 | 8/1982 | Rose | 426/524 |
| 4,343,822 | 8/1982 | Rose | 425/524 |
| 4,601,909 | 7/1986 | Nagoshi | 426/524 |
| 4,654,217 | 3/1987 | Nagoshi | 426/524 |
| 4,657,768 | 4/1987 | Nagoshi | 426/524 |
| 4,772,480 | 9/1988 | Yamane | 426/524 |
| 4,840,034 | 6/1989 | Liberman | 426/524 |
| 4,840,035 | 6/1989 | Liberman | 426/524 |
| 4,968,520 | 11/1990 | Wang | 426/524 |
| 4,978,546 | 12/1990 | Haram | 426/327 |
| 5,001,047 | 3/1991 | Liberman | 435/1 |
| 5,384,140 | 1/1995 | Gagel et al. | 426/243 |

*Primary Examiner*—George C. Yeung
*Attorney, Agent, or Firm*—Cook, Alex, McFarron, Manzo, Cummings & Mehler, Ltd.

[57] ABSTRACT

Meat products are chilled to the extent that water present therein is frozen in order to facilitate slicing, subsequent processing, packaging or other handling of the meat products. The chilling is carried out in sequential steps. The first chilling step contacts the product with a brine of sodium chloride at a temperature below the freezing point of water. The resulting prechilled food product is subjected to a second chilling step with a calcium chloride brine which is at a lower temperature than the sodium chloride brine and which further reduces the core temperature of the food product to well below the freezing point of water.

25 Claims, No Drawings

CHILLING OF MEAT PRODUCTS

BACKGROUND OF THE INVENTION

This invention generally relates to improved chilling of food products in preparation for slicing, packaging or further processing. More particularly, the invention is directed to a process for chilling or freezing food products, especially meat products, and to the products produced by subjecting the food products to sequential chilling operations including the use of calcium chloride brine. The food products are chilled more rapidly than previous approaches and without causing off-flavor development which can be experienced by chilling operations incorporating calcium chloride brines.

Various food processes incorporate a procedure for freezing the food in order to achieve a particular objective. As an example, large sausages are often subjected to freezing conditions prior to slicing and packaging the slices. In some circles, it is believed that this chilling or freezing of the meat facilitates slicing, stacking and packaging when such activities are carried out on a large, commercial scale. Other food processing or handling situations which are believed to benefit from a freezing operation include chilling or freezing smaller meat products such as wieners or hot dogs. Even if these smaller food products are not sliced in the food processing plant, chilling or freezing can be beneficial for packaging procedures because enhanced rigidity caused by chilling or freezing can simplify handling such as when the sausages are being inserted into packaging.

Heretofore, it has been known to use a brine component as a freezing medium. Such a freezing medium is applied to the outside surface of the meat product, such as by spraying, dipping in a brine vat, or the like, as a result of which the temperature of the food product is reduced in order to cause chilling or freezing of the food product or of water domains within the product. At times, additional components can be added to a brine composition in order to modify or improve its ability to act as a freezing medium.

It is also generally known that calcium chloride solutions exhibit freezing point depression properties which allow for chilling temperatures that are lower than that permitted by other solutions, such as sodium chloride brine. Examples of prior patents in this regard include Rose U.S. Pat. Nos. 4,343,821 and 4,343,822. One difficulty which has been observed concerning the use of a calcium chloride brine for chilling or freezing meat products is the development of undesirable flavor attributes which can be associated with calcium chloride. Accordingly, calcium chloride brines heretofore have not been favored, especially for meat products.

SUMMARY OF THE INVENTION

In accordance with the present invention, chilled food products are provided which are prepared by a sequential freezing operation. This includes a first chilling step for cooling a food product from a temperature substantially above room temperature to a chilled temperature at which an outer frozen shell is formed on the food product, even though the product core temperature can be above the freezing point of water. This first chilling step can be carried out with a chilled sodium chloride brine or any other suitable chilling procedure. The thus prechilled food product is then subjected to a second chilling step by contacting it with a calcium chloride brine which is at a temperature lower than, and which can be substantially lower than, that of a sodium chloride brine. This second chilling step rapidly reduces the temperature of the prechilled food product to a substantially lower temperature which can be well below the freezing point of water, in order to thereby provide the chilled or frozen food product.

It is accordingly a general object of the present invention to provide improved chill processing of chilled or frozen food products.

Another object of the present invention is to provide improved procedures for rapidly chilling food products in preparation for further processing, slicing, packaging and the like.

Another object of this invention is to provide improved procedures for chilling or freezing meat products, which procedures reduce overall costs while avoiding potential off-flavor development which can be associated with calcium chloride usage.

Another object of the present invention is to provide an improved chilling operation and chilled product which maintains acceptable flavor characteristics while reducing the time required to chill a food product to a desired temperature below the freezing point of water.

These and other objects, features and advantages of the present invention will be apparent from and clearly understood through a consideration of the following detailed description.

DESCRIPTION OF THE PREFERRED EMBODIMENTS

The present invention is well suited for use in connection with food products which are to be chilled or frozen in preparation for a subsequent treatment or handling operation. The invention is particularly well suited for meat products which are processed in permeable casings. These include large sticks or logs of sausage which are about one to ten feet long, typically about two to six feet long and are of a selected cross-section, such as round, oval, oblong, rectangular, square and the like. These are the types of sticks or logs which are typically circular in cross-section and which are made up in commercial sausage processing plants for the specific purpose of slicing on a commercial scale, typically in association with packaging the thus sliced food into stacks within consumer-sized packages which are sold as a unit for household consumption and the like. For many products, the large sticks or logs are sliced after removing the casing within which they were processed.

Similar stick-type products can also be subjected to chilling or freezing prior to slicing or other processing. Such products include so-called loaves which are often characterized as being non-circular in cross-section, such as being square, oblong or any other moldable shape. Often, these types of loaf products likewise will be sliced and packaged for distribution to the ultimate consumer. Smaller sausages can also be subjected to chilling or freezing for a purpose such as facilitating packaging operations, including insertion of the chilled or frozen small sausages into commercial packaging for distribution to the ultimate consumer. Typically, the smaller sausages will be of a size for single-person consumption, such as is typically provided for hot dogs, wieners, breakfast sausages, and other single-serving food products.

Food products such as sausages have a substantial water content. When subjected to the chilling or freezing approaches of the type generally encompassed by the present invention, the chilling will be to a temperature below the freezing point of water. As a result, the water component or components of the food products typically will be frozen by these types of chilling operations. This does not necessarily mean that the food products are entirely frozen.

Generally speaking, these food products are considered to have been fully chilled, and this is the chilled or frozen condition which is achieved in accordance with the present invention.

Typically, food products of the type which are processed and provided according to the present invention are initially at a temperature well above room temperature. Often, these products are or have been subjected to operations which are carried out at elevated temperatures. Examples include cooking, smoking, extrusion and stuffing, flavor treatments, heat treatments for biological control, and the like. A typical meat product should be subjected to heating or other treatment such that it will have a core temperature in order to thereby comply with governmental regulations. Generally, when such products are initially subjected to chilling or freezing procedures, the food product is at a core temperature of between about 150° F. and about 180° F. (about 65° C. to about 82° C.). It will be appreciated that the term product core temperature is generally known in the art and signifies a situation where a temperature gauge such as a meat thermometer is inserted so as to read the temperature at the general center of the meat product.

At these product core temperatures, the product is subjected to a first chilling step. This step is carried out with the objective of freezing an outer shell on the product. The preferred first chilling step includes contacting the entire outer surface, or a substantial portion of the outer product surface, with a chilled brine solution. This contacting can be carried out by suitable means such as nozzle spraying, dipping, transporting through a bath, and the like.

It will be appreciated that, in order for the brine to be flowable, same cannot be below a temperature at which it will freeze. It has been recognized that, at elevated temperatures such as those discussed above, brine components will be more readily absorbed into the food, when compared with contacts taking place when the food product is at a substantially lower temperature, such as one well below room temperature. In accordance with the presently described embodiments of the present invention, this first chilling step is carried out with a sodium chloride brine. Such a brine contains sodium chloride at a concentration of between about 10 and about 24 weight percent, preferably between about 19 and about 24 weight percent, based upon the total weight of the sodium chloride brine composition.

A typical sodium chloride brine will freeze at about −6° F. (−21° C.) when the sodium chloride is at optimum brine concentrations. Typically, the first chilling step will be carried out with the sodium chloride brine at a temperature of between about 20° F. (about −6.7° C.) and about −5° F. (about −20.5° C.), preferably between about 5° F. (about −15° C.) and −5° F. (about 20.5° C.). This first chilling step will proceed for a length of time which is typically between about 15 minutes and about 100 minutes, preferably between about 50 minutes and about 85 minutes. Thus, this first chilling step takes on the order of about one hour. During this time, the core temperature of the food product is reduced to between about 50° F. (about 10° C.) and about 150° F. (about 65° C.), preferably between about 80° F. (about 27° C.) and about 120° F. (about 50° C.).

At this stage, the primary effect is to prechill the food product and to freeze an outer shell of the food product which affords a physical barrier to possible calcium chloride penetration. An objective of this first chilling step is to achieve some degree of freezing of the outside of the food product prior to calcium chloride exposure. A secondary effect of this stage of the process is having the product absorb an acceptable amount of sodium chloride.

The prechilled food product or stick which is formed after the first chilling step is then subjected to a second chilling step. Typically, this second chilling step will be initiated promptly after the conclusion of the first chilling step. For example, the process of the invention can be carried out by conveying the food products on a continuous chain conveyor through an enclosure within which the first chilling step is carried out, along a short transition pathway, and into a different enclosure within which the second chilling step is carried out. Preferably, the meat products will be within the transition zone for only a very short time, typically a matter of several seconds, thereby avoiding any substantial temperature change which would bring thermal inefficiencies into the system.

The second chilling step is carried out by contacting the prechilled food product or stick with a calcium chloride brine. The calcium chloride brine has a calcium chloride concentration of between about 21 weight percent and about 34 weight percent, preferably between about 22 and about 33 weight percent, based upon the total weight of the second brine composition. When at an optimum concentration, a calcium chloride brine will freeze at about −50° F. (−46° C.) or colder. A typical calcium chloride brine temperature for the second chilling step is between about −5° F. and about −40° F. (about −20.5° C. and about −40° C.), more typically between about −7° F. and about −35° F. (about −21.7° C. and about −37° C.). This second chilling step substantially further reduces the core temperature of the food product or stick to a temperature which can be well below the freezing point of water. A typical core temperature is between about 10° F. and about 40° F. (about −12° C. and about 4.4° C.), preferably between about 10° F. and about 25° F. (about −12° C. and about −4° C.), most preferably between about 10° F. and about 20° F. (about −12° C. and about −6.7° C.).

It has been found that, because the temperature of the prechilled food product or stick is substantially reduced when compared with that of the food product or stick at the beginning of the first chilling step, a crust forms, and substantially no calcium chloride is absorbed into the food product or stick, meaning that typically not more than 1500 ppm of calcium chloride is absorbed into the meat. After completion of the second chilling step, a frozen or fully chilled food product or stick is provided.

Generally speaking, this second chilling step will proceed for about 15 minutes to about 180 minutes, preferably between about 100 minutes and about 160 minutes. Thus, this second chilling step is completed in roughly about two hours. The total time for both the first chilling step and the second chilling step approximates three hours. This is in comparison with the prior approach of using only a sodium chloride brine to chill meat sticks, such typically requiring about 4.5 hours to reach approximately the same temperature of the fully chilled or frozen stick. This represents a throughput increase of approximately 50%. Such a time savings, of course, translates into cost savings within a commercial scale food processing plant.

Exemplary illustrations concerning the invention and the advantages obtained by the invention are provided in the following Examples.

EXAMPLE 1

Commercially formulated and sized bologna logs at a core temperature of about 160° F. (71° C.) were subjected to a first chilling step. In this example, this step was carried with sodium chloride brine. This step proceeded for one hour by submersing the logs into the sodium chloride brine at −2° F.

(−19° C.). At this stage, the core temperature of the logs approximated 40° F. (4.4° C.). The thus prechilled logs were then moved to a different location and submersed in calcium chloride brine containing 26 weight percent $CaCl_2$. This chilling treatment proceeded for one hour and ten minutes while the temperature of the brine was −13° F. (−25° C.).

EXAMPLE 2: Taste Tests

Taste tests were conducted by an expert panel to evaluate the Example 1 sequential treatment in comparison with bologna of the same formula processed in otherwise identical manner except with a single chilling step. This single chilling step, which served as the control, was with the same standard sodium chloride brine which was used in Example 1 and at −2° F. (−19° C.). Under these control conditions, the bologna logs were treated for two hours and ten minutes. Thus, the total brine treatment time was the same for the logs subjected to the sequential brine chilling approach of Example 1 and for the control chilling approach using only the sodium chloride brine.

Meat logs chilled by the sequential approach in accordance with Example 1 and meat logs chilled by the control approach were sliced, packaged and stored at between about 32° F. and about 40° F. (between about 0° C. and about 4° C.) for three weeks. A panel of 25 randomly selected expert panelists evaluated samples in a discriminative test to measure degree of overall difference and degree of flavor difference between the control NaCl brine and $CaCl_2$ brine sequentially chilled meat and the control NaCl brine chilled meat. Also measured were off-flavor intensity and aftertaste intensity. Data were analyzed for treatment differences by analysis of variance in accordance with CR1SIDE and CR2SIDE Statgraphics Macros (Glennon, R. B., 1994). Mean scores are shown in Table I.

TABLE I

| Treatment | Degree of Overall Difference[1] | | Degree of Flavor Difference[1] | | Intensity of Off-Flavors[2] | | Intensity of Aftertaste[2] | |
|---|---|---|---|---|---|---|---|---|
| | Mean | S.D. | Mean | S.D. | Mean | S.D. | Mean | S.D. |
| Control, NaCl brine | 1.82 | 1.15 | 1.79 | 1.16 | 1.52 | 1.02 | 2.36 | 1.31 |
| Test, NaCl brine & $CaCl_2$ brine | 1.60 | 0.82 | 1.44 | 0.65 | 1.38 | 1.70 | 2.15 | 1.14 |
| Observed difference: | 0.224 NS | | 0.348 NS | | 0.140 NS | | 0.208 NS | |
| Acceptable difference: | 0.346 | | 0.368 | | 0.179 | | 0.252 | | n = 25
[1]Scale: 1 = no difference to 7 = large difference.
[2]Scale: 1 = not detectable to 7 = strong.
NS = Not significantly different from the Control.

From these data, the following conclusions were reached. The sequentially chilled ("Test") product was not significantly different overall from the conventionally chilled ("Control") product. The Test product scored 0.224 units lower than the Control product, which was within the acceptable difference of 0.346, based upon an acceptable risk factor from a business consideration standpoint. Concerning the degree of flavor difference, the sequentially chilled Test product was not significantly different in flavor from the Control product, the sequentially chilled product scoring 0.348 units lower than the control, which was within the acceptable difference of 0.368. Regarding off-flavor intensity considerations, the sequentially chilled product was not significantly different in off-flavor intensity from the Control product, the sequentially chilled Test product scoring 0.140 units lower than the Control product, which was within the acceptable difference of 0.179. Aftertaste intensity was evaluated, and it was found that the sequentially chilled Test product was not significantly different in aftertaste intensity when compared with the Control product, the sequentially chilled product scoring 0.208 units lower than the Control product, which was within the acceptable difference of 0.252. Panelists' comments were evaluated and determined to be generally inconclusive.

Separate but similar taste tests also were conducted. One group of bologna meat logs were chilled by the single chilling step approach described above using NaCl brine at 0° F. (17.8° C.) for 4.25 hours. Another group of bologna meat logs of the same formulation were chilled by a single-step $CaCl_2$ brine approach. The calcium chloride brine was at a temperature of −20° F. (−29° C.), the chilling treatment proceeding for two hours, and the brine included 26 weight percent calcium chloride. Such chilled logs were sliced, packaged and stored at between 32° F. and 40° F. for about two weeks.

A panel of 25 randomly selected expert panelists evaluated samples in a discriminative test to measure degree of overall difference and degree of flavor difference between the single-step $CaCl_2$ brine chilled meat ("Test") and the single-step NaCl Control meat. Also measured were off-flavor intensity and aftertaste intensity. Data were analyzed for treatment differences by analysis in accordance with CR1SIDE Statgraphics Macro (Glennon, R. B., 1994.) Mean scores are shown in Table II.

TABLE II

| Treatment | Degree of Overall Difference[1] | | Degree of Flavor Difference[1] | | Intensity of Off-Flavors[2] | | Intensity of Aftertaste[2] | |
|---|---|---|---|---|---|---|---|---|
| | Mean | S.D. | Mean | S.D. | Mean | S.D. | Mean | S.D. |
| Control, NaCl brine | 1.44 | 0.72 | 1.24 | 0.47 | 1.26 | 0.45 | 1.24 | 0.46 |
| Test, $CaCl_2$ brine | 1.94 | 1.18 | 1.72 | 1.13 | 1.38 | 1.73 | 1.76 | 1.19 |
| Observed difference: | 0.500* | | 0.484* | | 0.120 NS | | 0.516* | |
| Acceptable difference: | 0.348 | | 0.403 | | 0.466 | | 0.395 | |
| Lost opportunity risk (Type 1 error[3]): | 0.123 | | 0.043 | | N/A | | 0.053 | | n = 25
[1]Scale: 1 = no difference to 7 = large difference.
[2]Scale: 1 = not detectable to 7 = strong.
[3]Type 1 error based on a 0.6 unit difference between means.
*Significantly different from the Control.
NS = Not significantly different from the Control.

The Table II data indicate that the Test product, chilled in the calcium chloride brine only, was significantly different overall from the Control using the standard sodium chloride brine only. The Test product scored 0.500 units higher than the Control products, which was greater than the acceptable difference of 0.348. The Test product was different significantly in flavor from the Control product, the Test product scoring 0.484 units higher than the Control product, which was greater than the determined acceptable difference of 0.403. The Test product was not significantly different in off-flavor intensity from the Control product, the Test product scoring 0.120 units higher than the Control product, which was within the acceptable difference of 0.466. The Test product was significantly different in aftertaste intensity from the Control product, the Test product scoring 0.516 units higher than the Control product, which was greater than the acceptable difference of 0.395. Some panelists commented on a "saltier" flavor, indicated a "salty, astringent aftertaste" and "gritty" texture for the Test product.

EXAMPLE 3

Commercially formulated and sized cotto salami logs at about 162° F. (about 72° C.) were subjected to a first chilling step with sodium chloride brine, at a concentration of about 23 weight percent. This step proceeded for 74 minutes by spraying the logs with the sodium chloride brine at −4° F. (−20° C.). At this stage, the core temperature of the logs was about 88° F. (about 31° C.). The thus prechilled logs were then moved to a different location and sprayed with calcium chloride brine containing about 25 weight percent $CaCl_2$. This chilling treatment proceeded for 149 minutes while the temperature of the brine was about −10° F. (about −23° C.) to provide a frozen meat product having a core temperature of between 19° F. and 22° F. (about −7° C. and about −5.5° C.).

EXAMPLE 4

Commercially formulated and sized turkey bologna logs at about 162° F. (about 72° C.) were subjected to a first chilling step with sodium chloride brine at a concentration of about 23 weight percent. This step proceeded for 57 minutes by spraying the logs with the sodium chloride brine at −4° F. (−20° C.). At this stage, the core temperature of the logs approximated 110° F. (about 43° C.). The thus prechilled logs were then moved to a different location and sprayed with calcium chloride brine containing about 28 weight percent $CaCl_2$. This chilling treatment proceeded for 114 minutes while the temperature of the brine was about −23° F. (−30.5° C.) to provide a frozen meat stick having a core temperature of between about 20° F. and about 23° F. (about −6.7° C. and about −5° C.).

It will be understood that the embodiments of the present invention which have been described are illustrative of some of the applications of the principles of the present invention. Various modifications may be made by those skilled in the art without departing from the true spirit and scope of the invention.

We claim:

1. A process for chilling a meat product, comprising:
   providing a meat product at a temperature above room temperature;
   subjecting the meat product to a first chilling step by contacting the product with a brine of sodium chloride at a concentration of between about 10 and about 24 weight percent, based upon the weight of the brine, said first chilling step reducing the core temperature of the meat product to between about 50° F. (about 10° C.) and about 150° F. (about 65.6° C.) to provide a prechilled meat product;
   subjecting the prechilled product to a second chilling step by contacting the prechilled product with a calcium chloride brine having a calcium chloride concentration of between about 21 and about 34 weight percent, based upon the weight of the brine, said second chilling step reducing the core temperature of the meat product to between about 10° F. (about −12° C.) and about 40° F. (about 4.4° C.) to provide a frozen meat product; and
   said second chilling step is carried out at a temperature substantially lower than that of said first chilling step.

2. The chilling process in accordance with claim 1, wherein said second chilling step is initiated after said first chilling step is completed.

3. The chilling process in accordance with claim 1, wherein said sodium chloride brine of the first chilling step is at a temperature of between about 20° F. (about −6.7° C.) and about −5° F. (about −20.5° C.).

4. The chilling process in accordance with claim 1, wherein said first chilling step is carried out for between about 15 minutes and about 100 minutes.

5. The chilling process in accordance with claim 1, wherein said calcium chloride brine of the second chilling step is at a temperature of between about −5° F. (about −20.5° C.) and about −40° F. (about −40° C.).

6. The chilling process in accordance with claim 1, wherein said second chilling step is carried out for between about 15 minutes and about 180 minutes.

7. The chilling process in accordance with claim 1, wherein said providing step provides large sticks or loaves of sausage which are at least about 1 foot long.

8. The chilling process in accordance with claim 1, wherein said providing step provides a plurality of sausages sized as single-serving food products.

9. The chilling process in accordance with claim 1, wherein said second chilling step freezes water present within the meat product.

10. The chilling process in accordance with claim 1, wherein sodium chloride is absorbed into said meat product during said first chilling step, and wherein not more than 1500 ppm of calcium chloride is absorbed into the meat product during said second chilling step.

11. The chilling process in accordance with claim 1, wherein said sodium chloride brine of the first chilling step is at a temperature of between about 5° F. (about −15° C.) and about −5° F. (about −20.5° C.).

12. The chilling process in accordance with claim 1, wherein said first chilling step reduces the core temperature of the product to between about 80° F. and about 120° F. (about 26.7° C. and about 50° C.).

13. The chilling process in accordance with claim 1, wherein said second chilling step reduces the core temperature of the product to between about 10° F. and about 20° F. (about −12° C. and about −6.7° C.).

14. A chilled meat product prepared by a process comprising:
   providing a meat product at a temperature above room temperature;
   subjecting the meat product to a first chilling step by contacting the product with a brine of sodium chloride at a concentration of between about 10 and about 24 weight percent, based upon the weight of the brine, said first chilling step reducing the core temperature of the meat product to between about 50° F. (about 10° C.) and about 150° F. (about 65.6° C.) to provide a prechilled meat product;
   subjecting the prechilled product to a second chilling step by contacting the prechilled product with a calcium chloride brine having a calcium chloride concentration of between about 21 and about 34 weight percent, based upon the weight of the brine, said second chilling step reducing the core temperature of the meat product to between about 10° F. (about −12° C.) and about 40° F. (about 4.4° C.) to provide a frozen meat product having substantially no calcium chloride absorbed into the meat product during said second chilling step; and
   said second chilling step is carried out at a temperature substantially lower than that of said first chilling step.

15. The chilled meat product in accordance with claim 14, wherein said providing step provides large sticks or loaves of sausage which are at least about 1 foot long.

16. The chilled meat product in accordance with claim 14, wherein said providing step provides a plurality of sausages sized as single-serving food products.

17. The chilled meat product in accordance with claim 14, wherein sodium chloride is absorbed into said meat product during said first chilling step, and wherein substantially no calcium chloride is absorbed into the meat product during said second chilling step.

18. A process for chilling a meat product, comprising:

providing a meat product at a temperature above room temperature;

subjecting the meat product to a first chilling step until an outer shell of the meat product freezes, said first chilling step reducing the core temperature of the meat product to between about 50° F. (about 10° C.) and about 150° F. (about 65.6° C.) to provide a prechilled meat product;

subjecting the prechilled product to a second chilling step by contacting the prechilled product with a calcium chloride brine having a calcium chloride concentration of between about 21 and about 34 weight percent, based upon the weight of the brine, said second chilling step reducing the core temperature of the meat product to between about 10° F. (about −12° C.) and about 40° F. (about 4.4° C.) to provide a frozen meat product; and said second chilling step is carried out at a temperature substantially lower than that of said first chilling step.

19. The chilling process in accordance with claim 18, wherein said second chilling step is initiated after said first chilling step is completed.

20. The chilling process in accordance with claim 18, wherein said calcium chloride brine of the second chilling step is at a temperature of between about −5° F. (about −20.5° C.) and about −40° F. (about −40° C.).

21. The chilling process in accordance with claim 18, wherein not more than 1500 ppm of calcium chloride is absorbed into the meat product during said second chilling step.

22. The chilling process in accordance with claim 18, wherein said second chilling step reduces the core temperature of the product to between about 10° F. and about 20° F. (about −12° C. and about −6.7° C.).

23. A chilled meat product prepared by the process according to claim 18, wherein said chilled meat product has substantially no calcium chloride absorbed into the meat product during said second chilling step.

24. The chilled meat product in accordance with claim 23, wherein said providing step provides large sticks or loaves of sausage which are at least about 1 foot long.

25. The chilled meat product in accordance with claim 23, wherein said providing step provides a plurality of sausages sized as single-serving food products.

* * * * *